United States Patent
Choi et al.

(10) Patent No.: US 7,019,072 B2
(45) Date of Patent: Mar. 28, 2006

(54) METHOD OF PREPARING LATEX FOR COATING PAPER

(75) Inventors: Ho-Yeul Choi, Daejeon (KR);
Seung-Uk Yeu, Daejeon (KR);
Chang-Sun Han, Daejeon (KR);
Wan-Sik Cha, Gwangmyung (KR)

(73) Assignee: LG Chem, Ltd., Seoul (KR)

( * ) Notice: Subject to any disclaimer, the term of this patent is extended or adjusted under 35 U.S.C. 154(b) by 425 days.

(21) Appl. No.: 10/203,181

(22) PCT Filed: Dec. 20, 2001

(86) PCT No.: PCT/KR01/02221

§ 371 (c)(1),
(2), (4) Date: Oct. 4, 2002

(87) PCT Pub. No.: WO02/50128

PCT Pub. Date: Jun. 27, 2002

(65) Prior Publication Data

US 2003/0105222 A1   Jun. 5, 2003

(30) Foreign Application Priority Data

Dec. 20, 2000   (KR) .............................. 2000/79336

(51) Int. Cl.
*C08F 2/32* (2006.01)

(52) U.S. Cl. ...................... 524/801; 524/804; 524/836; 428/512

(58) Field of Classification Search ................ 524/801, 524/804, 836
See application file for complete search history.

(56) References Cited

U.S. PATENT DOCUMENTS 5,354,800 A     10/1994   Suzuki et al.
2004/0236053 A1 * 11/2004   Chisholm et al.

FOREIGN PATENT DOCUMENTS

| JP | 57-153012 A | 9/1982 |
| JP | 3-37203 A | 2/1991 |
| JP | 3-229703 A | 10/1991 |
| JP | 6-107716 A | 4/1994 |
| JP | 06-298815 A | 10/1994 |

* cited by examiner

*Primary Examiner*—Edward J. Cain
(74) *Attorney, Agent, or Firm*—Birch, Stewart, Kolasch & Birch, LLP

(57) ABSTRACT

The present invention relates to styrene-butadienie latex, specifically a method of preparing latex for coating paper which shows excellent adhesion while maintaining printing property and comprised in a composition for coating paper. To achieve the object of the present invention, it provides a method of preparing styrene-butadiene latex comprising the step of emulsion polymerization by adding 0.1 to 10 parts by weight of chain transfer agent comprising; i) monofunctional thiol compound, and ii) polyfunctional thiol compound having at least two thiol groups based on 100 parts by weight of styrene-butadiene monomer composition. The latex prepared by the present method can easily control molecular weight and gel content, so that polymerization stability and mechanical stability are improved and thus, it is possible to print paper with high speed and to improve adhesion.

14 Claims, No Drawings

METHOD OF PREPARING LATEX FOR COATING PAPER

This application is the national phase under 35 U.S.C. §371 of PCT International Application No. PCT/KR01/02221 which has an International filing date of Dec. 20, 2001, which designated the United States of America.

BACKGROUND OF THE INVENTION (a) Field of the Invention

The present invention relates to styrene-butadiene latex, specifically a method of preparing latex for coating paper which shows excellent adhesion while maintaining printing property and comprised in a composition for coating paper.

(b) Description of the Related Art

In preparing paper for coating, recently the companies reduce the cost price through increase of coating speed, addition of a functional inorganic pigment and reduction of amount of binders. Specifically, in latex comprised in coating composition, mechanical stability and polymerization stability by small-particlization are very important factors, and adhesion becomes a very important one of printing properties.

A conventional coating method of paper with coating composition comprises transferring coating solution from an applicator-roll to surface of paper and removing excess coating solution by a blade or an air-knife. In this case, since the coating solution is subjected to high pressure, high shear fluidity and mechanical stability that is different from polymerization stability of latex are very important. Thus, as coating speed increases, such mechanical stability and high shear fluidity will be important and they will be important factors to determine the productivity of coating paper.

If the stability of latex is destructed under the high pressure, the coating solution around the applicator-roll is gummed up, which causes quality deterioration of paper as well as remarkable reduction of continuous product of paper.

In addition, in preparing latex for coating paper, since latex is used as a binder, a lot of scales are produced in a stirrer or inner side of a reactor. As latex is made to small particles, the coagulants increase. They act as impurities in the following process, which results in unevenness of material properties in the continuing process and decreases productivity because much time and effort will be needed to remove them.

Unlike the above bulk coagulant in the reactor, fine coagulum exists in the suspension. It tends to increase the amount as latex is made to small particles. The coagulum is screened after complete of polymerization and during preparing coating solution by screening. If there are many impurities, it is difficult to control products because it needs much time and cost. Also, a severe problem such as streak occurs on the surface of paper so that it deteriorates the quality of paper.

As latex is made to small particles and concentration of solid ratio increases gradually, it is important for latex to have polymerization stability. The polymerization stability relates to improvement of productivity and high-shear fluidity as well as increase of productivity. This also lessens unevenness of material properties in the continuous producing so that it is helpful to improve quality relatively.

Due to recent high-speed coating, it is required to have stability of latex and due to high speed printing tendency, it becomes important to have adhesion.

The above paper coating composition comprises a pigment, adhesive and other additives. The synthetic latex such as styrene-butadiene latex is mainly used as the adhesive. The adhesive significantly affects the quality of printing paper, specifically adhesion.

The important printing properties include adhesion (dry pick resistance), drying speed of ink, gloss, water resistance, and wet ink receptivity.

Due to high cost of latex of the coating composition and the tendency of high-speed printing, the importance of adhesion becomes high because the companies require reducing the amount of latex. That is, the coating paper should resist strong mechanical strength against surface of coating paper of pigments with as less amount of latex as possible so that it does not occur exfoliation from coating layer and falling off of pigment, thus, the coating paper can have clear printing appearance.

In addition, factors of styrene-butadiene latex affecting to adhesion of coating paper are glass transition temperature, particle size, composition of monomers and so on. Generally, adhesion shows high value at determined s gel content and the optimized gel content value depends on the composition of monomers.

Another important factor is a drying speed of ink. In the case of multi color printing, printing is done by four colors of blue, black, red, and yellow. As printing speed increases, time term to print the next color becomes short, lo thus it is required faster drying speed of ink. If ink is not well dried and goes to the next step, print mottle or post-smear can occur. The relationship of gel content and drying speed of ink affects film-formability according to gel content as well as swelling index showing amount of solvent which latex particle can contain.

Gloss is an important factor to increase commercial value and quality of printing paper. Gloss includes paper gloss of coating paper and printing gloss after printing. As the value of both of them increases, paper has good appearance.

In order to increase paper gloss, generally particle size of latex should increase or content of latex should decrease. However, those methods have a demerit of lowering adhesion. In order to increase printing gloss, air permeability should decrease so that it is required to hold solvent on the surface until having stable arrangement after printing. Thus, it needs to decrease drying speed of ink.

In addition, water resistance is also important printing property of offset printing. In the offset printing, water is used in the printing process. If water resistance(wet pick resistance)decreases, pigments can be exfoliated by applied strong physical strength during printing.

As like adhesion, water resistance and gel content have a relationship. That is, water resistance is the strongest at determined gel content. However, gel content that shows the strongest water resistance and gel content that shows the highest adhesion do not coincide. There is a tendency that water resistance shows the maximum point at lower gel content and adhesion shows the maximum point at higher gel content.

Another printing property required in the offset printing is wet ink receptivity. As described in the above, since water is used in the offset printing, if coating paper does not effectively absorb water when printing, ink that does not have compatibility with water will not adhere to coating paper, which results in low degree of printing. Generally, wet ink receptivity and water resistance are opposite properties so that it is difficult to increase both of them.

As above, it is very difficult to prepare latex that can provide coating paper with excellent printing properties and coating and printing circumstances become stricter.

SUMMARY OF THE INVENTION

Considering the above problems of prior art, the present invention provides a method of preparing latex that has remarkably improved polymerization stability and mechanical stability by controlling molecular weight, gel content and structure of latex.

It is another object of the present invention to provide a method of improving productivity of paper by increasing concentration of solid ratio used in producing paper, which by improving quality of latex by small-particlization.

In order to achieve the above objects, the present invention provides a method of preparing styrene-butadiene latex comprising the step of emulsion polymerization by adding 0.1 to 10 parts by weight of chain transfer agent comprising;
  i) monofunctional thiol compound, and
  ii) polyfunctional thiol compound having at least two thiol groups based on 100 parts by weight of styrene-butadiene monomer composition.

More specifically, the present invention provides a method of preparing styrene-butadiene latex comprising:
  a) a step of preparing seed latex by emulsion polymerizing styrene and butadiene monomer composition and chain transfer agent;
  b) a step of preparing first-shell covered latex by adding covering composition comprising styrene and butadiene monomer composition and chain transfer agent to said seed latex and emulsion polymerizing them; and
  c) a step of preparing second-shell covered latex by adding covering composition comprising styrene and butadiene monomer composition and chain transfer agent to said first-shell covered latex and emulsion polymerizing them;

In addition, the present invention provides styrene-butadiene latex prepared by the above method.

Also, the present invention provides a paper coating composition comprising latex prepared by the above method.

In addition, the present invention provides paper prepared by covering the above paper coating composition.

DETAILED DESCRIPTION OF THE PREFERRED EMBODIMENTS

Hereinafter, the present invention will be explained in detail.

As a result of extensive researching latex for coating paper, the present inventors found that styrene-butadiene latex with improved polymerization stability and mechanical stability and excellent printing property can be prepared by controlling gel content and structure of latex. Thus, the present invention was accomplished based on this.

In preparing latex, only monofunctional thiol compound such as alkyl mercaptan has been conventionally used as a chain transfer agent. The present invention, however, provides a method of preparing styrene-butadiene latex that can control molecular weight, gel content and structure of latex by using polyfunctional thiol compound having two, three or four thiol groups in a molecule adding to monofunctional thiol. The latex prepared by this method has better polymerization stability and mechanical stability as well as better adhesion than the prior latex so that coating paper prepared by using the latex has good printing properties and can be printed with high speed.

To achieve the above object, the present invention comprises a step of emulsion polymerization styrene-butadiene monomer composition by adding a determined amount of chain transfer agent comprising monofunctional thiol compound and polyfunctional thiol compound.

In this case, monofunctional thiol compound of chain transfer agent is essentially used in all steps and in preparing seed latex, monofunctional thiol compound can be used alone. The above polyfunctional thiol compounds control molecular weight, gel content and structure of latex by mixing with monofunctional thiol compound in the second step and third step in which covering the first shell and the second shell respectively.

Preparing latex in the present invention comprises two steps or multi steps. Conventionally, latex is prepared by emulsion polymerization by continuously covering one to three shells to seed latex which was prepared previously. The other reaction conditions such as polymerization initiator, emulsifier, electrolyte and so on are the same to the known art. That is, preparation of latex comprises a) a step of preparing seed latex; b) a step of preparing first-shell covered latex; and c) a step of preparing second-shell covered latex.

The above step a), that is, a step of preparing seed latex comprises adding styrene and butadiene monomer composition, chain transfer agent and polymerization initiator and polymerizing them.

The above step b), that is, a step of preparing first-shell covered latex comprises adding styrene and butadiene monomer composition, chain transfer agent and polymerization initiator of which amounts were modified and polymerizing them.

Also, the above step c), that is, a step of preparing second-shell covered latex comprises adding styrene and butadiene monomer composition, chain transfer agent and polymerization initiator of which amounts were modified and polymerizing them so that latex controlled molecular weight and gel content is prepared.

The amount of styrene and butadiene monomer compositions used in the above steps are 20–55 parts by weight of 1,3-butadiene, 45–80 parts by weight of styrene, and 1–15 parts by weight of ethylene unsaturated acid monomer based on 100 parts by weight of all monomers.

1,3-butadiene provides flexibility for copolymer. When the content is less than 20 parts by weight, the copolymer becomes harden and when the content is more than 55 parts by weight, water resistance decreases.

Styrene provides suitable hardness and water resistance. When the content is less than 45 parts by weight, the effect is not enough and when the content is more than 80 parts by weight, adhesion and film-formability may decrease.

Ethylene unsaturated acid monomer is properly used to improve adhesion of polymers and to modify stability of latex particles. It is preferably 2 to 9 parts by weight. When the content is less than 1 part by weight, the above effect is not obtained and when the content is more than 15 parts by weight, there seems to occur problem such as polymerization stability. Preferable examples of the ethylene unsaturated acid monomer are at least one selected from the group consisting of unsaturated carboxylic acid of methacrylic acid, acrylic acid, itaconic acid, chrotonic acid, fumaric acid or maleic acid; and unsaturated polycarboxylic alkyl ester which having at least one carboxylic group in a molecule such as itaconic acid monoethyl ester, fumaric acid monobutyl ester, or maleic acid monobutyl ester.

The amount of styrene and butadiene monomer compositions further comprises 0.1–20 parts by weight of cyanide vinyl monomer, and 0.1–30 parts by weight of copolymerizable vinyl monomer based on 100 parts by weight of total monomers.

The cyanide vinyl monomer is effective to improve printing gloss and the amount is preferably 3 to 8 parts by weight. The specific example is acrylonitrile or methacrylonitrile.

When synthesizing copolymer latex in the present invention, if necessary, vinylic monomer copolymerizable with the above monomers can be used. The example of these monomers is at least one selected from the group consisting of unsaturated carboxylic acid alkyl ester of methylacrylate, methylmethacrylate, ethylacrylate, ethylmethacrylate, butylacrylate, or butylmethacrylate; unsaturated carboxylic acid hydroxyalkyl ester of β-hydroxyethyl acrylate, β-hydroxypropyl acrylate, or β-hydroxyethyl methacrylate; unsaturated carboxylic acid amide of acrylamide, methacrylamide, itaconamide, or maleic acid monoamide and derivatives thereof; and aromatic vinyl monomer such as α-methylstyrene, vinyl toluene, or p-methylstyrene. The above unsaturated carboxylic acid alkyl ester provides suitable hardness for copolymer and improves film-formability. The content is preferably 3–15 parts by weight. When the content is more than 30 parts by weight, it has bad influence to water resistance. The above unsaturated carboxylic acid amide and derivatives thereof are useful to improve chemical stability, mechanical stability and water resistance of copolymer latex. The content is preferably less than 10 parts by weight.

As described in the above, a chain transfer agent used in the present invention is a mixture of monofunctional thiol compound such as alkyl mercaptan and polyfunctional thiol compound having at least two thiol groups in a molecule in a ratio of 1:0.1 to 1:10, which can control molecular weight of copolymer, gel content and gel structure. The chain transfer agent comprising the above compounds is used in a ratio of 0.1 to 10 parts by weight based on 100 parts by weight of styrene and butadiene monomer composition and it is preferably 0.1 to 2.0 parts by weight. When less than 0.1 parts by weight, it is difficult to show the effect and when more than 10 parts by weight, it has bad effect to reaction speed and reaction stability. The above monofunctional thiol compound can be n-dodecyl mercaptan or t-dodecyl mercaptan. Also, the specific example of polyfunctional thiol chain transfer agent is at least one selected from the group consisting of 1,5-pentanedithiol, 1,6-hexanedithiol, 2-ethylhexyl-3-mercaptopropionate, butyl 3-mercaptopropionate, dodecyl 3-mercaptopropionate, ethyl 2-mercaptopropionate, ethyl 3-mercaptopropionate, methyl 3-mercaptopropionate, pentaerythritol tetrakis (3-mercaptopropionate), 2-ethylhexyl mercaptoacetate, ethyl 2-mercaptoacetate, 2-hydroxymethyl-2-methyl-1,3-propanethiol and pentaerythritol tetrakis (2-mercaptoacetate).

The latex prepared by this method has glass transition temperature of −20 to 25° C., preferably −5 to 15° C. Also, particle size of latex is 80 to 200 nm, preferably 100 to 150 nm. If particle size is less than 100 nm, low-shear fluidity increases, and paper gloss, ink-drying speed and wet ink receptivity decrease. On the contrary, if particle size is more than 150 nm, high-shear fluidity increases, and printing gloss, adhesion and water resistance decrease. In addition, gel content of latex is 40–95%, preferably 60–80%.

As above, the properties of latex prepared by the above method can be controlled so that when preparing coating paper, the paper comprising the coating composition has improved polymerization stability, mechanical stability and adhesion.

The present invention is further explained in more detail with reference to the following EXAMPLES. These examples, however, should not in any sense be interpreted as limiting the scope of the present invention.

The particle sizes and gel contents of Examples 1 to 6 and Comparison Examples 1 to 3 are measured as follows.

1) Particle size of latex: Laser Scattering Analyzer (Nicomp) was used.

2) Gel content: Latex finished polymerization was set to pH 7–8 and dried at normal temperature for more than 24 hours. When film is formed enough, it was cut to determined size, placed into 80-mesh net, and dissolved in excess of tetrahydrofuran for 14 hours. The content of non-dissolved is shown in percent.

EXAMPLES

Example 1

According to the following three steps, latex was prepared and the ingredients used in each step were shown in the below-table 1.

First step: 10L-pressure reactor equipped with a stirrer, a thermometer, a cooler, and an inlet of nitrogen gas and equipped so as to continuously provide monomers, emulsifiers and a polymerization initiator was purged with nitrogen and then was added with components of first step of table 1 and was heated to 65° C. Thereto, 1 part by weight of potassium persulfate as a polymerization initiator was added and stirred for 300 minutes to complete polymerization of seed latex. The obtained seed has an average particle size of 70 nm, 98% of conversion rate, and 86% of gel content.

Second step: In order to cover the first shell into the above seed latex obtained from the first step, 28 parts by weight of seed latex was added and was heated to 75° C. The components of second step of table 1 were continuously added for 150 minutes to polymerize them. After adding all components, they were further stirred for 60 min to complete polymerization. The obtained latex with first shell has an average particle size of 105 nm, 90% of conversion rate, and 62% of gel content.

Third step: In order to cover the second shell into the above latex obtained from the second step, components of third step of table 1 were continuously added for 60 minutes while maintaining 75° C. of reactor which was filled with 507 parts by weight of latex obtained in the second step. After adding all components, they were further stirred for 200 min to complete polymerization. The obtained final latex with second shell has an average particle size of 123 nm, 98% of conversion rate, and 75% of gel content.

TABLE 1

| | Example 1 | | |
|---|---|---|---|
| Components (Parts by weight) | First step | Second step | Third step |
| Butadiene | 33 | 39 | 40 |
| Styrene | 42 | 43 | 42 |
| Methylmethacrylate | 12 | 8 | 4 |
| Acrylonitrile | 8 | 4 | 9 |
| Itaconic acid | 5 | 2 | 2 |
| Acrylic acid | — | 4 | 3 |
| Sodium dodecyl dibenzene sulfonic acid | 6 | 0.9 | 0.3 |
| Chain transfer agent | | | |
| t-dodecyl mercaptan | 0.15 | 1.0 | 0.8 |
| Pentaerythritol tetrakis | — | 1.2 | 1.4 |
| Sodium bicarbonate | 0.5 | 0.4 | 0.4 |
| Ion exchange water | 420 | 66 | 79 |
| Potassium persulfate | 1 | 2.5 | 2.0 |

Examples 2 to 4

All reaction conditions and processes are the same to Example 1 except that kind and amount of chain transfer agent are varied as table 2.

TABLE 2

| Components (Parts by weight) | First step | Second step | Third step |
|---|---|---|---|
| Example 2 | | | |
| t-dodecyl mercaptan | 0.15 | 0.7 | 1.1 |
| 3-mercaptopropionate | 0 | 1.5 | 1.0 |
| Example 3 | | | |
| t-dodecyl mercaptan | 0.15 | 1.0 | 0.8 |
| 2-mercapto acetate | 0 | 1.2 | 1.4 |
| Example 4 | | | |
| t-dodecyl mercaptan | 0.15 | 0.7 | 1.1 |
| 2-mercapto acetate | 0 | 1.5 | 1.0 |

Example 5

First step: same to Example 1.

Second step: In order to cover the first shell into the above seed latex obtained from the first step, 28 parts by weight of seed latex was added into the reactor and was heated to 75° C. The components of second step of table 3 were continuously added for 150 minutes to polymerize them. After adding all components, they were further stirred for 60 min to complete polymerization. The obtained latex with first shell has an average particle size of 107 nm, 90% of conversion rate, and 71% of gel content.

Third step: In order to cover the second shell into the above latex obtained from the second step, components of third step of table 3 were continuously added for 60 minutes while maintaining 75° C. of reactor which was filled with 507 parts by weight of latex obtained in the second step. After adding all components, they were further stirred for 200 min to complete polymerization. The obtained final latex with second shell has an average particle size of 125 nm, 98% of conversion rate, and 79% of gel content.

TABLE 3

| | Example 5 | | |
|---|---|---|---|
| Components (Parts by weight) | First step | Second step | Third step |
| Butadiene | 33 | 40 | 42 |
| Styrene | 42 | 42 | 38 |
| Methylmethacrylate | 12 | 6 | 6 |
| Acrylonitrile | 8 | 6 | 9 |
| Itaconic acid | 5 | 3 | 2 |
| Acrylic acid | — | 3 | 3 |
| Sodium dodecyl dibenzene sulfonic acid | 6 | 0.8 | 0.4 |
| Chain transfer agent | | | |
| t-dodecyl mercaptan | 0.15 | 1.0 | 0.8 |
| Pentaerythritol tetrakis | — | 1.2 | 1.4 |
| Sodium bicarbonate | 0.5 | 0.4 | 0.4 |
| Ion exchange water | 420 | 66 | 79 |
| Potassium persulfate | 1 | 2.5 | 2.0 |

Example 6

All reaction conditions and processes are the same to Example 5 except that kind and amount of chain transfer agent are varied as table 4.

TABLE 4

| Components (Parts by weight) | First step | Second step | Third step |
|---|---|---|---|
| Example 6 | | | |
| t-dodecyl mercaptan | 0.15 | 0.7 | 1.1 |
| 3-mercaptopropionate | 0 | 1.5 | 1.0 |

Comparative Examples 1 to 2

All reaction conditions and processes are the same to Example 1 except that only monofunctional compounds as a chain transfer agent are used to prepare latex in each step and the content thereof is shown in table 5.

TABLE 5

| Components (Parts by weight) | | First step | Second step | Third step |
|---|---|---|---|---|
| Com. Ex. 1 | t-dodecyl mercaptan | 0.15 | 0.8 | 1.4 |
| Com. Ex. 2 | t-dodecyl mercaptan | 0.15 | 1.4 | 0.8 |

Comparative Example 3

All reaction conditions and procedures are the same to Example 5 except that only monofunctional thiol compounds as a chain transfer agent are used to prepare latex in each step and the content thereof is shown in table 6.

TABLE 6

| Components (Parts by weight) | | First step | Second step | Third step |
|---|---|---|---|---|
| Com. Ex. 3 | t-dodecyl mercaptan | 0.15 | 0.8 | 1.4 |

Experimental Example 1

(Properties Test of Latex)

In order to measure polymerization stability of latex prepared in the above Examples 1 to 6 and Comparative Examples 1 to 3, they were passed through 150-, 200-, 325-mesh net respectively and the amount of scales were measured by ppm based on the solid ratio and shown in table 7.

TABLE 7

| | Ex. 1 | Ex. 2 | Ex. 3 | Ex. 4 | Ex. 5 | Ex. 6 | Com. Ex. 1 | Com. Ex. 2 | Com. Ex. 3 |
|---|---|---|---|---|---|---|---|---|---|
| 150-mesh | <20 | <10 | <30 | <20 | <50 | <30 | <200 | <100 | <200 |
| 200-mesh | <20 | <10 | <30 | <20 | <50 | <30 | <200 | <100 | <200 |
| 325-mesh | <50 | <20 | <60 | <50 | <80 | <80 | <200 | <100 | <400 |

In addition, in order to compare polymerization stability of Examples 1 to 6 and Comparative Examples 1 to 3, inner scale was weighed after completion of polymerization and shown in table 8.

TABLE 8

|  | Ex. 1 | Ex. 2 | Ex. 3 | Ex. 4 | Ex. 5 | Ex. 6 | Com. Ex. 1 | Com. Ex. 2 | Com. Ex. 3 |
|---|---|---|---|---|---|---|---|---|---|
| Weight of inner scale (g) | 40 | 15 | 40 | 25 | 65 | 55 | >500 | >500 | >800 |

Example 7

(Preparation of Coating Composition)

In order to compare and evaluate latex of Examples 1 to 6 and Comparative Examples 1 to 3, paper-coating solutions as in table 9 were prepared. The distilled water was added as to have 67.3% of solid ratio.

TABLE 9

| paper-coating solutions | Content (parts by weight) |
|---|---|
| First grade clay | 57 |
| Calcium carbonate | 43 |
| Styrene-butadiene latex | 12 |
| Oxidized starch | 1.3 |

Example 8

(Preparing Coating Paper)

Coating paper was obtained by coating paper-coating solutions prepared in Example 7 according to the following conditions.

Coating: Rod Coating, No.6
Drying: Oven 105° C., 30 seconds
Calendar: Super calendar, 80° C., 100 kg/cm, 4 m/min, 2 times pass
Original Paper: Commercially available paper (average weight 72 gsm)

The properties of these were measured as following method and shown in table 10.

1) Adhesion:

After printing several times in the RI printer, the degree of tear was measured by naked eyes and evaluated by 5-score method. As the score increases, adhesion becomes better. After Ink of tack value 12, 14, and 16 was used and measured, an average was obtained.

2) Water Resistance

After adding wet pick water by using molten-roll in the RI printer and printing, the degree of tear was measured by the same method as that of adhesion. The value was measured by using ink of tack value 14 after printing one time.

3) Drying Speed of Ink

After printing in the RI printer, the degree of smear was measured by 5-score method. As the score increases, the drying speed of ink is high.

4) Wet Ink Receptivity

After adding water in the RI printer and printing, the degree of transfer of ink was measured by 5-score method. Ink of low tack value was used in order not to occur tear. As the score increase, the wet ink receptivity is high.

5) Paper Gloss

Average value was measured after measuring various parts of coating paper using Optical Gloss Meter (HUNTER type, 75° gloss)

6) Printing Gloss

This is measured in the same method as in the paper gloss after 24 hours after printing in RI printer.

TABLE 10

| Properties | Ex. 1 | Ex. 2 | Ex. 3 | Ex. 4 | Ex. 5 | Ex. 6 | Com. Ex. 1 | Com. Ex. 2 | Com. Ex.3 |
|---|---|---|---|---|---|---|---|---|---|
| Adhesion | 4.4 | 4.5 | 4.3 | 4.3 | 4.5 | 4.6 | 3.9 | 4.0 | 4.0 |
| Water resistance | 4.1 | 4.2 | 4.2 | 4.1 | 4.3 | 4.3 | 4.0 | 4.1 | 4.1 |
| Drying speed of ink | 4.2 | 4.1 | 4.1 | 4.0 | 3.9 | 3.9 | 4.1 | 4.0 | 3.9 |
| Wet ink receptivity | 4.2 | 4.2 | 4.3 | 4.3 | 4.2 | 4.2 | 4.2 | 4.3 | 4.2 |
| Paper gloss (%) | 71 | 72 | 71 | 71 | 69 | 70 | 70 | 71 | 69 |
| Printing gloss (%) | 81 | 81 | 80 | 81 | 78 | 78 | 80 | 81 | 78 |

The styrene-butadiene latex prepared by the present invention can easily control molecular weight, gel content, and molecular weight by using polyfunctional thiol compound as a chain transfer agent so that it is possible to print paper with high speed and to improve adhesion while maintaining various printing properties. In addition, it is possible to reduce the weight of latex in preparing coating composition.

What is claimed is:

1. A method of preparing styrene-butadiene latex comprising the step of emulsion polymerization by adding 0.1 to 10 parts by weight of chain transfer agent comprising:
   i) monofunctional thiol compound, and
   ii) polyfunctional thiol compound having at least two thiol groups based on 100 parts by weight of styrene-butadiene monomer composition.

2. The method of claim 1, wherein said polymerization comprises:
   a) a step of preparing seed latex by emulsion polymerizing styrene and butadiene monomer composition and chain transfer agent;
   b) a step of preparing first-shell covered latex by adding covering composition comprising styrene and butadiene monomer composition and chain transfer agent to said seed latex and emulsion polymerizing them; and
   c) a step of preparing second-shell covered latex by adding covering composition comprising styrene and butadiene monomer composition and chain transfer agent to said first-shell covered latex and emulsion polymerizing them.

3. The method of claim 1, wherein said monofunctional thiol compound is n-dodecyl mercaptan or t-dodecyl mercaptan.

4. The method of claim 1, wherein said polyfunctional thiol compound is at least one selected from the group consisting of 1,5-pentanedithiol, 1,6-hexanedithiol, 2-ethylhexyl-3-mercaptopropionate, butyl 3-mercaptopropionate, dodecyl 3-mercaptopropionate, ethyl 2-mercaptopropionate, ethyl 3-mercaptopropionate, methyl 3-mercaptopropionate, pentaerythritol tetrakis (3-mercaptopropionate), 2-ethylhexyl mercaptoacetate, ethyl 2-mercaptoacetate, 2-hydroxymethyl-2-methyl-1,3-propanethiol and pentaerythritol tetrakis (2-mercaptoacetate).

5. The method of claim 1, wherein weight ratio of said monofunctional compound to said polyfunctional thiol compound which having at least two thiol groups is 1:0.1 to 1:10.

6. The method of claim 1, wherein said styrene and butadiene monomer composition comprises 20 to 55 parts by weight of 1,3-butadiene, 45 to 80 parts by weight of styrene, and 1 to 15 parts by weight of ethylene-unsaturated acid monomer based on 100 parts by weight of total monomer.

7. The method of claim 1, wherein said styrene and butadiene monomer composition further comprises 0.1 to 20 parts by weight of cyanide vinyl monomer and 0.1 to 30 parts by weight of vinyl monomer copolymerizable with the cyanide vinyl monomer based on 100 parts by weight of total monomer.

8. The method of claim 7, wherein said ethylene-unsaturated acid monomer is at least one selected from the group consisting of unsaturated carboxylic acid of methacrylic acid, acrylic acid, itaconic acid, chrotonic acid, fumaric acid or maleic acid; and unsaturated polycarboxylic alkyl ester which having carboxylic group of itaconic acid monoethyl ester, fumaric acid monobutyl ester, or maleic acid monobutyl ester.

9. The method of claim 7, wherein said cyanide vinyl monomer is acrylonitrile or methacrylonitrile.

10. The method of claim 7, wherein said copolymerizable vinylic monomer is at least one selected from the group consisting of unsaturated carboxylic acid alkyl ester of methylacrylate, methylmethacrylate, ethylacrylate, ethylmethacrylate, butylacrylate, or butylmethacrylate; unsaturated carboxylic acid hydroxyalkyl ester of β-hydroxyethyl acrylate, β-hydroxypropyl acrylate, or β-hydroxyethyl methacrylate; unsaturated carboxylic acid amide of acrylamide, methacrylamide, itaconamide, or maleic acid monoamide and derivatives thereof; and aromatic vinyl monomer such as α-methylstyrene, vinyl toluene, or p-methylstyrene.

11. A styrene-butadiene latex prepared by the method of claim 1.

12. The latex of claim 11, wherein said latex has gel content of 40–90%, glass transition temperature of −20 to 25° C., and average particle size of 80 to 200 nm.

13. A paper coating composition comprising the styrene-butadiene latex of claim 11.

14. A coating paper prepared by covering a paper with the paper coating composition of claim 13.

* * * * *